United States Patent
Kogure (10) Patent No.: US 10,009,511 B2
(45) Date of Patent: Jun. 26, 2018

(54) IMAGE PROCESSING SYSTEM THAT PERFORMS READING AND TRANSMITTING PROCESS OF ORIGINAL IMAGE, METHOD OF CONTROLLING IMAGE PROCESSING SYSTEM, AND STORAGE MEDIUM

(71) Applicant: CANON KABUSHIKI KAISHA, Tokyo (JP)

(72) Inventor: Takeshi Kogure, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/950,106

(22) Filed: Nov. 24, 2015

(65) Prior Publication Data

US 2016/0173729 A1    Jun. 16, 2016

(30) Foreign Application Priority Data

Dec. 11, 2014 (JP) ................................. 2014-250821

(51) Int. Cl.
    *H04N 1/44* (2006.01)
    *H04N 1/00* (2006.01)

(52) U.S. Cl.
    CPC ....... *H04N 1/4413* (2013.01); *H04N 1/00281* (2013.01); *H04N 1/00315* (2013.01); *H04N 1/00411* (2013.01); *H04N 1/00811* (2013.01); *H04N 1/00925* (2013.01); *H04N 2201/0094* (2013.01)

(58) Field of Classification Search
    None
    See application file for complete search history.

(56) References Cited

U.S. PATENT DOCUMENTS

| | | | |
|---|---|---|---|
| 7,633,636 B2* | 12/2009 | Nagumo | H04N 1/00413 358/1.13 |
| 2006/0026434 A1* | 2/2006 | Yoshida | G06F 21/608 713/182 |
| 2010/0259778 A1* | 10/2010 | Kashioka | G06F 3/1222 358/1.14 |

(Continued)

FOREIGN PATENT DOCUMENTS

JP    07288625 A    10/1995

*Primary Examiner* — Mohammad Ghayour
*Assistant Examiner* — Pawandeep Dhingra
(74) *Attorney, Agent, or Firm* — Rossi, Kimms & McDowell LLP (57) ABSTRACT

An image processing system which makes it possible to prevent an erroneous operation from being performed by an improper user. A console section of an MFP receives an operation from a user. A scanner reads an original to generate image data. A modem transmits the image data. A network interface receives an instruction for a reading and transmitting process for causing the scanner to read an original and then causing the modem to transmit image data generated by the scanner. When the instruction for the reading and transmitting process is received, a controller determines, based on a state of operation of the console section, whether or not the reading and transmitting process can be accepted. When acceptance of the reading and transmitting process is permitted as a result of the determination, the controller controls the scanner and the modem to perform the reading and transmitting process.

10 Claims, 11 Drawing Sheets

(56) References Cited

U.S. PATENT DOCUMENTS

| | | | |
|---|---|---|---|
| 2011/0002003 A1* | 1/2011 | Suwabe | G06F 21/629 358/1.14 |
| 2012/0260350 A1* | 10/2012 | Yamada | H04N 1/00411 726/28 |
| 2013/0239179 A1* | 9/2013 | Matsumura | H04N 1/00408 726/4 |
| 2014/0043642 A1* | 2/2014 | Yasuoka | H04N 1/00854 358/1.14 |
| 2016/0295033 A1* | 10/2016 | Hirasawa | H04N 1/0097 |

* cited by examiner

A facsimile transmission job has been received.
Transmission is started after an original is read by the scanner.

Immediately start reading the original?

[START READING]    [CANCEL]
     701            702

IMAGE PROCESSING SYSTEM THAT PERFORMS READING AND TRANSMITTING PROCESS OF ORIGINAL IMAGE, METHOD OF CONTROLLING IMAGE PROCESSING SYSTEM, AND STORAGE MEDIUM

BACKGROUND OF THE INVENTION

Field of the Invention

The present invention relates to a technique for reading and transmitting an original image according to an instruction received e.g. from an information processing apparatus.

Description of the Related Art

Conventionally, there has been known a function of transmitting image data generated by a client computer as an information processing apparatus to a facsimile machine via a LAN (local area network) and then faxing the generated image data from the facsimile machine. In the case of using this function, a user can designate a destination of facsimile transmission on a client computer side.

On the other hand, there has also been known a function of notifying a facsimile machine only of a destination designated by a user on a client computer side without preparing image data, and causing the facsimile machine to generate image data by reading an original and fax the generated image data to the designated destination (see Japanese Patent Laid-Open Publication No. H07-288625).

For example, a case is envisaged in which a user desires to fax both a cover page generated by a client computer and image data obtained by causing a facsimile machine to read the body of an original. In this case, it is possible to cause the facsimile machine to generate a job based on information on a fax destination and information on the cover page which are sent from the client computer, and perform facsimile transmission by adding a read image of the body of the original to the cover page during execution of the job.

However, there can be a case where when the facsimile machine generates a job according to a transmission instruction from the client computer, another user is operating the facsimile machine. In this case, the other user can perform an erroneous operation for the job instructed from the client computer. Therefore, it is required to avoid such an erroneous operation which may be performed by the other user.

In a case where the facsimile machine performs user management using a user authentication function, a job generation instruction is transmitted from the client computer to the facsimile machine together with user authentication information, whereby the facsimile machine can perform user authentication. The use of the user authentication function enables the facsimile machine to discriminate between the user operating the facsimile machine and the user having issued the job generation instruction from the client computer, so that the erroneous operation can be avoided. However, if the use of the user authentication function by the facsimile machine is made compulsory, the user friendliness of the facsimile machine is degraded.

SUMMARY OF THE INVENTION

The present invention makes it possible to prevent an erroneous operation from being performed on a reading and transmitting process of an original image, by a user different from a user who instructed the process, irrespective of whether or not a user authentication function is used.

In a first aspect of the invention, there is provided an image processing system comprising an operation unit configured to receive an operation from a user, a reading unit configured to read an original to thereby generate image data, a transmission unit configured to transmit the image data generated by the reading unit, a reception unit configured to receive an instruction for a reading and transmitting process for causing the reading unit to read an original and then causing the transmission unit to transmit the image data generated by the reading unit, and a control unit configured to determine, based on a state of operation of the operation unit, whether or not the reading and transmitting process can be accepted, in a case where the instruction for the reading and transmitting process is received by the reception unit, and control the reading unit and the transmission unit to perform the reading and transmitting process, in a case where the acceptance of the reading and transmitting process is permitted as a result of the determination.

In a second aspect of the invention, there is provided a method of controlling an image processing system including an operation unit configured to receive an operation from a user, a reading unit configured to read an original to thereby generate image data, and a transmission unit configured to transmit the image data generated by the reading unit, the method comprising receiving an instruction for a reading and transmitting process for causing the reading unit to read an original and then causing the transmission unit to transmit the image data generated by the reading unit, and determining, based on a state of operation of the operation unit, whether or not the reading and transmitting process can be accepted, in a case where the instruction for the reading and transmitting process is received by the receiving, and controlling the reading unit and the transmission unit to perform the reading and transmitting process, in a case where the acceptance of the reading and transmitting process is permitted as a result of the determination.

In a third aspect of the invention, there is provided a non-transitory computer-readable storage medium storing a computer-executable program for causing a computer to execute a method of controlling an image processing system including an operation unit configured to receive an operation from a user, a reading unit configured to read an original to thereby generate image data, and a transmission unit configured to transmit the image data generated by the reading unit, wherein the method comprises receiving an instruction for a reading and transmitting process for causing the reading unit to read an original and then causing the transmission unit to transmit the image data generated by the reading unit, and determining, based on a state of operation of the operation unit, whether or not the reading and transmitting process can be accepted, in a case where the instruction for the reading and transmitting process is received by the receiving, and controlling the reading unit and the transmission unit to perform the reading and transmitting process, in a case where the acceptance of the reading and transmitting process is permitted as a result of the determination.

According to the invention, it is possible to prevent an erroneous operation from being performed on the reading and transmitting process of an original image, by a user different from a user who instructed the process, irrespective of whether or not the user authentication function is used.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. It should be noted that the present invention is not limited to the embodiments described below, and not all combinations of features described in the embodiments are absolutely essential to solution according to the invention.

Figure 1:
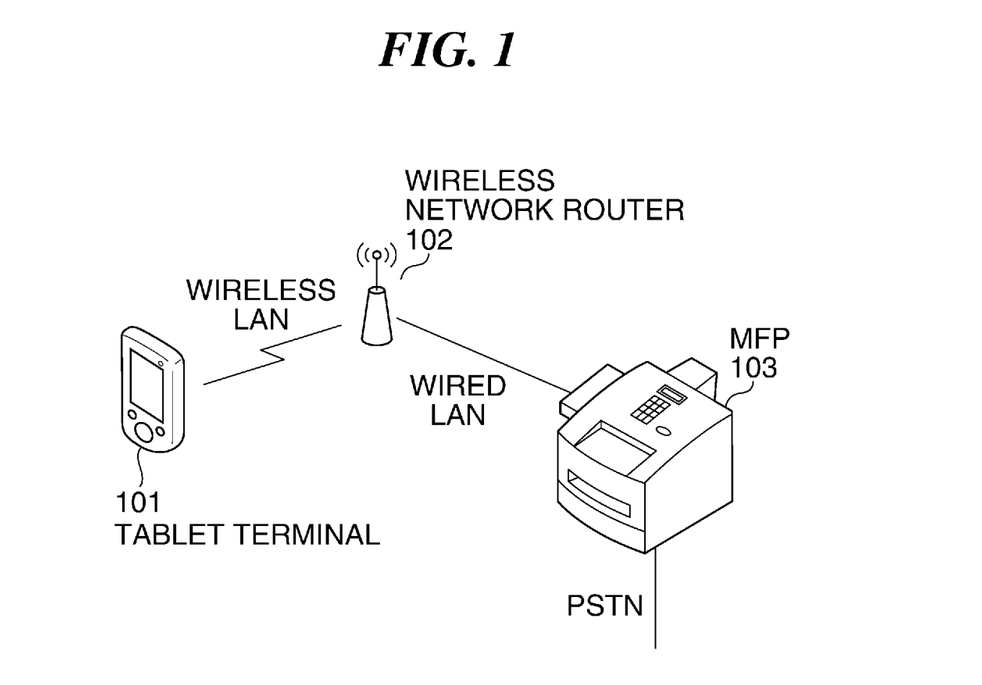
FIG. 1 is a diagram showing the whole configuration of a network including an image forming system.

FIG. 1 is a block diagram showing the whole configuration of a network including an image forming system according to an embodiment of the invention. In the present embodiment, an MFP (multi-function peripheral) 103 is shown as an example of an image forming apparatus. A tablet terminal 101 as an example of an information processing apparatus is a terminal apparatus that communicates with the MFP 103 via a wireless network router (wireless access point) 102. Although the MFP 103 is an example of the image processing apparatus, a single unit of the MFP 103 may be referred to as the image processing system, or the whole system including the MFP 103 and the tablet terminal 101 may be referred to as the image processing system. The tablet terminal 101 and the wireless network router 102 are connected by a wireless LAN (local area network). The MFP 103 and the wireless network router 102 are connected by a wired LAN. Further, the MFP 103 is connected to a public switched telephone network (PSTN) as well.

Note that the communication path between the tablet terminal 101 and the MFP 103 is not limited to the above-mentioned one. For example, the tablet terminal 101 and the wireless network router 102 may be connected by a wired LAN. Further, the MFP 103 and the wireless network router 102 may be connected by a wireless LAN. Furthermore, the tablet terminal 101 and the MFP 103 may be connected to the same network. Note that there may exist a plurality of tablet terminals 101 and a plurality of MFPs 103. In the following, the tablet terminal 101 is simply referred to as "the terminal 101". The terminal 101 is not absolutely required to be a tablet type, but it may be a stationary type.

Figure 2:
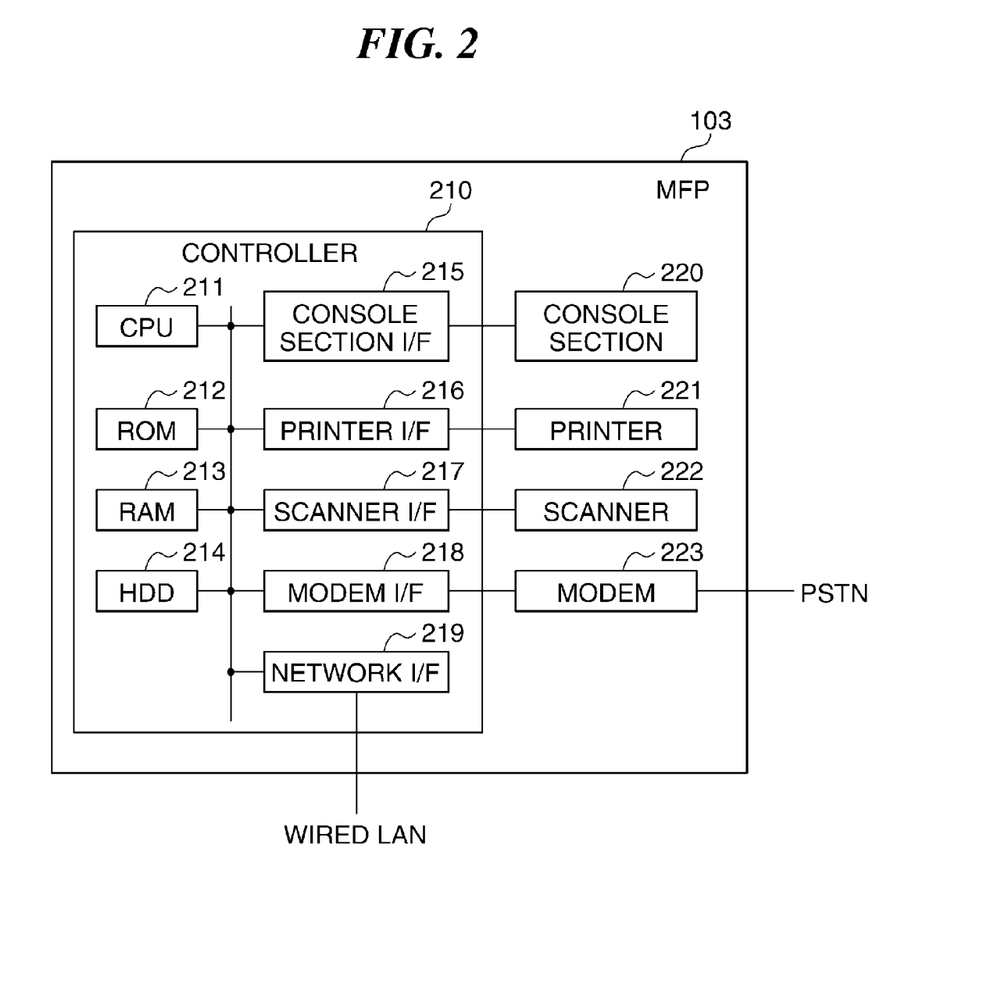
FIG. 2 is a block diagram showing the hardware configuration of an MFP.

FIG. 2 is a block diagram showing the hardware configuration of the MFP 103. A controller 210 includes a CPU 211 as a control unit and controls the overall operation of the MFP 103. The CPU 211 reads out control programs stored in a ROM 212 and performs various control operations for reading, printing, communication, and so forth. A RAM 213 is used as a main memory and a temporary storage area, such as a work area, for the CPU 211. It is assumed in the present example that in the MFP 103, the single CPU 211 performs various processing operations shown in flowcharts described hereinafter, using a single memory (the RAM 213 or a HDD 214), but this is not limitative. For example, the various processing operations may be performed by cooperation of a plurality of CPUs and a plurality of RAMs or HDDs.

The HDD 214 stores image data and various programs. A console section interface 215 connects between a console section 220 as an operation unit and the controller 210. The console section 220 is provided with a liquid crystal display section having a touch panel function, a keyboard, etc. and serves as a reception unit for receiving operations, inputs, and instructions from a user.

A printer interface 216 connects between a printer 221 and the controller 210. Image data to be printed by the printer 221 is transferred to the printer 221 from the controller 210 via the printer interface 216 and is printed on a recording medium by the printer 221. A scanner interface 217 connects between a scanner 222 as a reading unit and the controller 210. The scanner 222 reads an original to thereby generate image data, whereafter the scanner 222 inputs the image data to the controller 210 via the scanner interface 217.

A modem interface 218 connects between a modem 223 and the controller 210. The modem 223 is connected to the PSTN and performs facsimile communication with a facsimile machine, not shown, for transmission of image data. A network interface 219 as a reception unit connects the controller 210 (MFP 103) to the wired LAN. The MFP 103 is capable of transmitting and receiving image data and various kinds of information to and from an external apparatus using the network interface 219.

Figure 3:
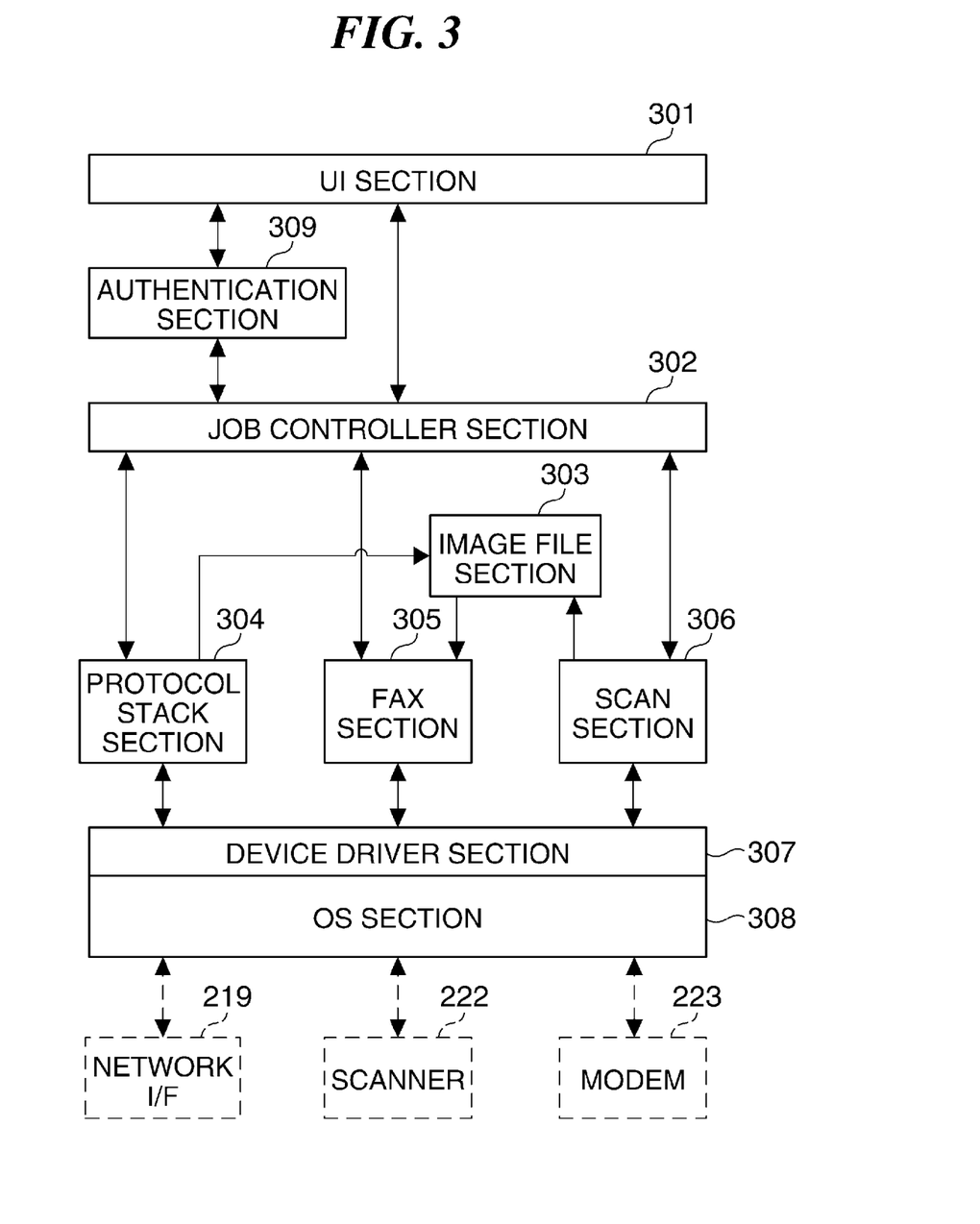
FIG. 3 is a block diagram showing the software configuration of the MFP.

FIG. 3 is a block diagram showing the software configuration of the MFP 103. Blocks each enclosed by solid lines in FIG. 3 represent respective software modules each of which is executed by the CPU 211 reading out a program stored in the ROM 212 or the HDD 214 and executing the same. A UI (user interface) section 301 provides various kinds of information to a user and receives various instructions from the user, via the console section 220 (see FIG. 2). A job controller section 302 receives a copy job, a print job, a fax job, or the like job, and controls the execution of the received job. A protocol stack section 304 holds various network protocols, such as TCP/IP and HTTP (hypertext transfer protocol).

In the present embodiment, image data transmitted from the terminal 101 is received via the network interface 219 according to a network protocol held in the protocol stack section 304. The received image data is stored by an image file section 303. The image file section 303 is a software module for managing image data stored in the RAM 213 and the HDD 214.

The image file section 303 stores not only image data received via the network interface 219, but also image data generated by the scanner 222. Generation of image data by the scanner 222 is controlled by a scan section 306. A fax section 305 controls facsimile communication that is performed via the modem 223. In facsimile transmission from the MFP 103, the fax section 305 reads out image data stored by the image file section 303 and transmits the same.

An OS section (operating system section) 308 adjusts modules and tasks to thereby manage the overall operation of the software of the MFP 103. The OS section 308 is combined with a device driver section 307. The device driver section 307 controls hardware devices, such as the scanner 222 and the modem 223.

An authentication section 309 is a module for controlling user authentication. A user authentication function can be switched between enabled and disabled. When the user authentication function is enabled in the MFP 103, a user needs to perform a login operation for inputting authentication information including a user name and a password, via the console section 220. The authentication section 309 checks the input authentication information against authentication information registered in advance to thereby determine whether or not the authentication is successful. Only when the authentication is successful, the user is permitted to use the MFP 103. Note that when the user authentication function is disabled in the MFP 103, the user is permitted to use the MFP 103 without the login operation and the authentication by the authentication section 309.

Figure 4:
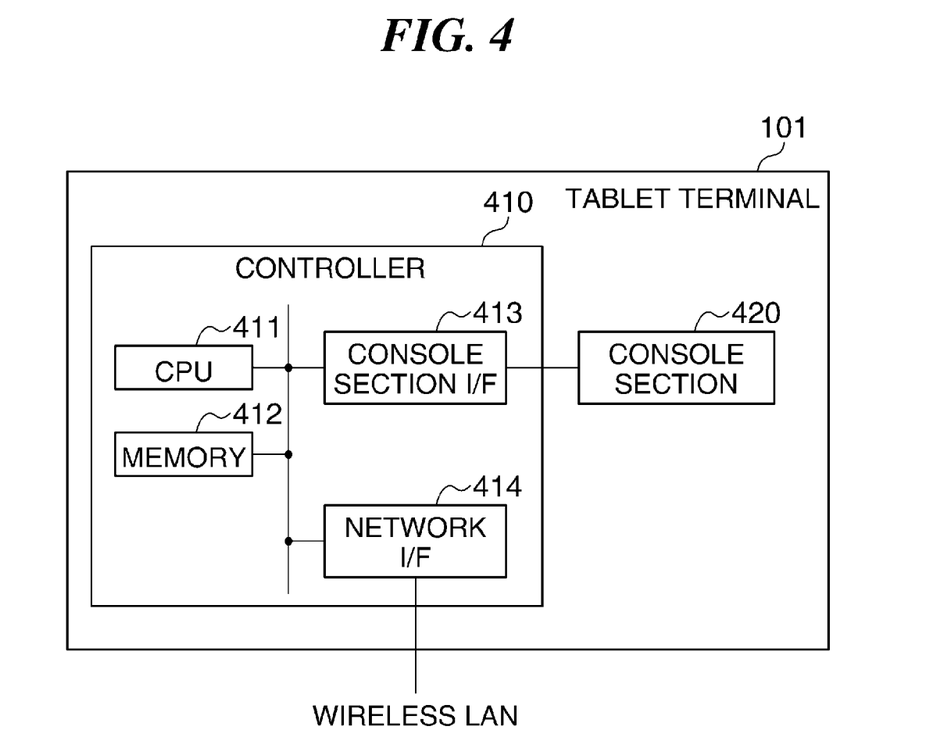
FIG. 4 is a block diagram showing the hardware configuration of a tablet terminal.

FIG. 4 is a block diagram showing the hardware configuration of the terminal 101. A controller 410 including a CPU 411 controls the overall operation of the terminal 101. The CPU 411 reads out control programs stored in a memory 412 and performs various control operations. The memory 412 is used as a main memory and a temporary storage area, such as a work area, for the CPU 411. It is assumed in the present example that in the terminal 101, the single CPU 411 performs various processing operations using the single memory 412, but this is not limitative. For example, the various processing operations may be performed by cooperation of a plurality of CPUs and a plurality of memories.

A console section interface 413 connects between a console section 420 and the controller 410. The console section 420 is provided with a liquid crystal display section having a touch panel function and serves as a reception unit for receiving operations, inputs, instructions, etc. from a user. A network interface 414 connects the controller 410 (i.e. the terminal 101) to a wireless LAN. The terminal 101 is capable of transmitting image data and information to an external apparatus and receiving various kinds of information from the same using the network interface 414.

In the present embodiment, instructions transmitted from the terminal 101 to the MFP 103 and received by the network interface 219 of the MFP 103 include at least an instruction for a first transmission process (reading and transmitting process) and an instruction for a second transmission process. The instruction for the first transmission process is issued so as to cause the MFP 103 to read an original by the scanner 222 and then fax image data generated by the scanner 222, using the fax section 305 and the modem 223 as a transmission unit. On the other hand, the instruction for the second transmission process is issued so as to cause the MFP 103 to fax image data prepared by the terminal 101, using the fax section 305 and the modem 223 as the transmission unit.

Figure 5:
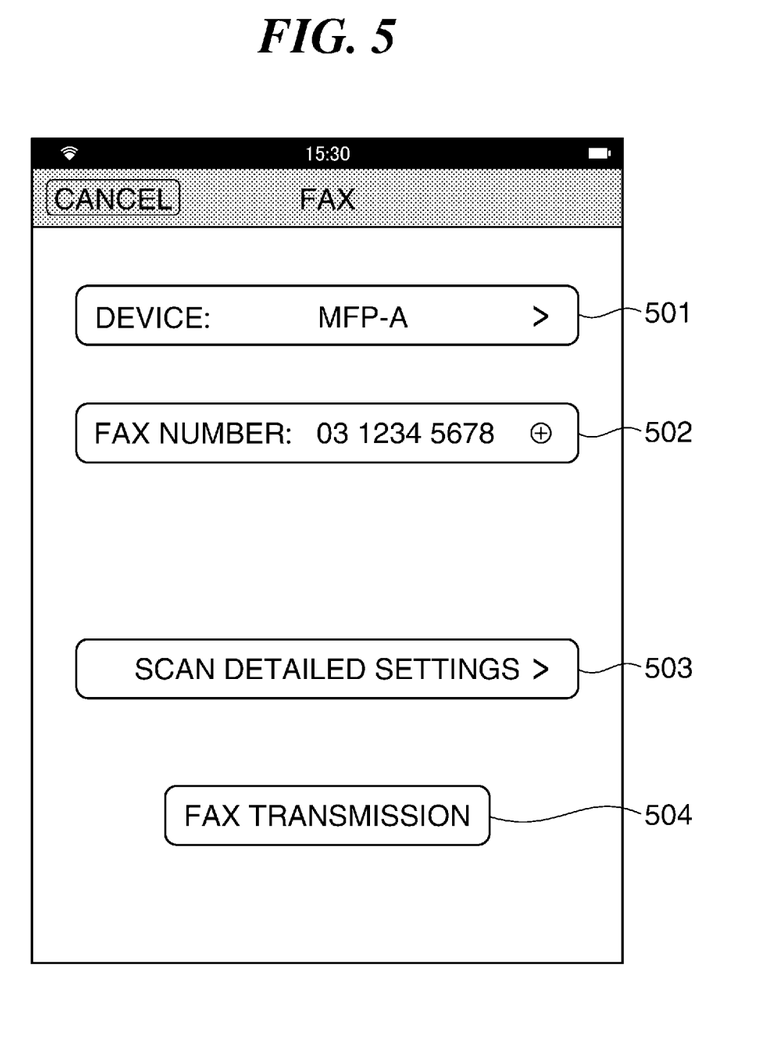
FIG. 5 is a view of an example of an operation screen of a facsimile transmission application, which is displayed when an instruction for a first transmission process is to be transmitted.

FIG. 5 is a view of an example of an operation screen of a facsimile transmission application, which is displayed on the terminal 101. The facsimile transmission application can be downloaded from a server on the Internet and be additionally installed in the terminal 101. The facsimile transmission application is a software program which operates on the OS section 308. The use of the facsimile transmission application makes it possible to configure settings for causing the MFP 103 to perform facsimile transmission, on the terminal side. Operations of the terminal 101, described hereinafter, are performed based on instructions from the facsimile transmission application.

In particular, the operation screen shown in FIG. 5 is displayed on the console section 420 when the user of the terminal 101 is going to transmit the instruction for the first transmission process. When the facsimile transmission application is started in response to a predetermined operation of the terminal 101 by the user, the operation screen shown in FIG. 5 is displayed. In the operation screen, a setting field 501 is used to set an MFP to be caused to perform facsimile transmission. When there are a plurality of MFPs, one of them is selected using the setting field 501. More specifically, when the user touches the setting field 501, the terminal 101 searches for MFPs existing in its neighborhood, and the MFPs thus found are displayed in a list. The user can select an MFP to be caused to perform facsimile transmission from the displayed list of the MFPs.

A setting field 502 is used to set a telephone number (fax number) as a destination of facsimile transmission. The user may input a telephone number using a soft keyboard displayed on the terminal 101 or alternatively may select the telephone number by referring to an address book stored in the terminal 101.

A setting field 503 is used to configure detailed settings of a scanning process (reading process) performed using the scanner 222 of the MFP 103. When the user touches the setting field 503, a screen for designation of reading parameters including a resolution, an original size, color or monochrome, and so forth is displayed, and the terminal 101 receives scan settings from the user via the screen.

A facsimile transmission key 504 is used to instruct the MFP 103 to perform facsimile transmission. When the facsimile transmission key 504 is pressed after completing the configuration of the settings in the respective setting fields 501, 502, and 503, communication between the terminal 101 and the MFP 103 is started.

Figure 6:
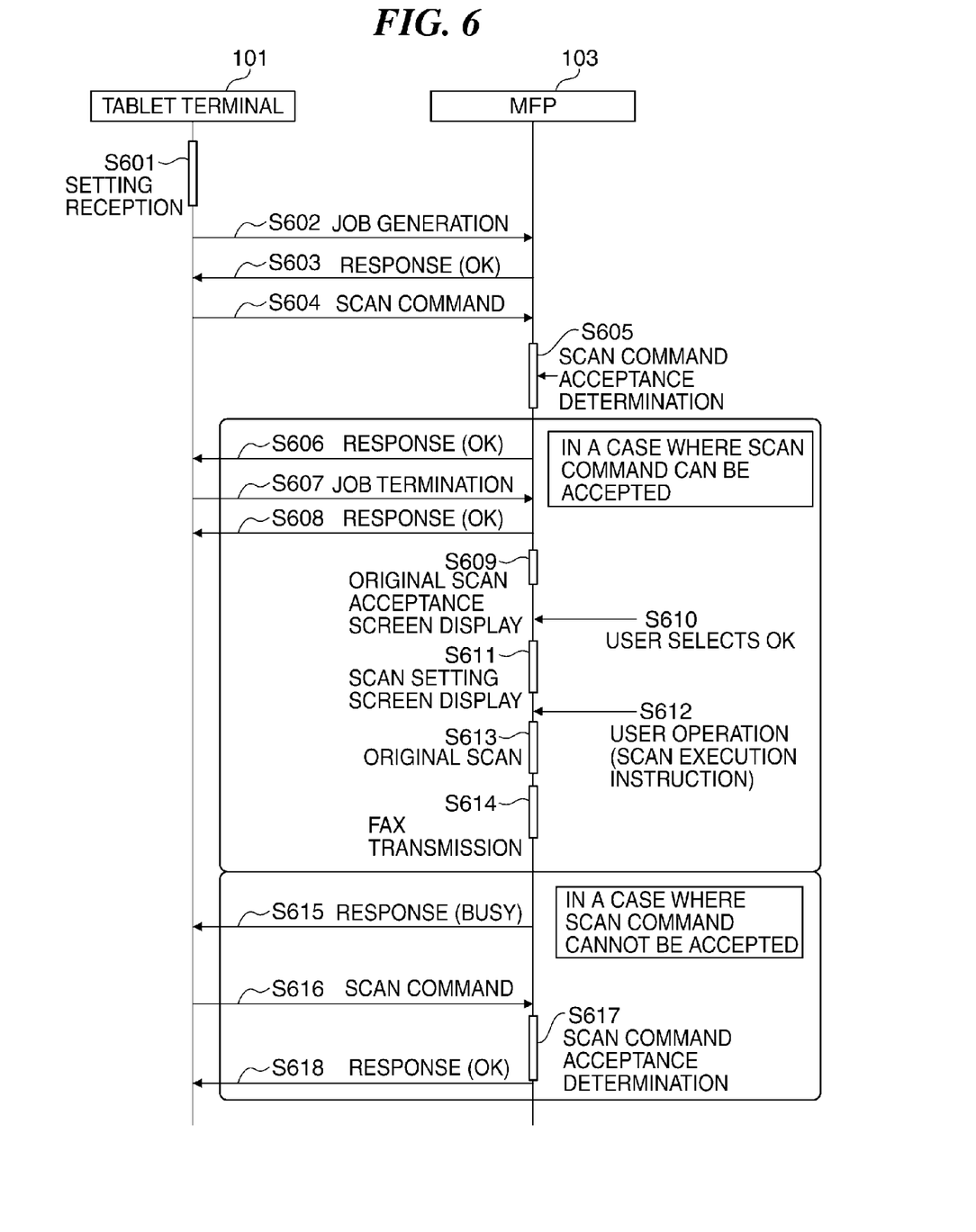
FIG. 6 is a diagram of a sequence of operations performed when the first transmission process is instructed.

FIG. 6 is a diagram of a sequence of operations performed between the terminal 101 and the MFP 103 when the terminal 101 designates the first transmission process.

In a step S601, the terminal 101 receives settings from a user via the operation screen shown in FIG. 5. In a step S602, the terminal 101 sends a command for job generation to the MFP 103. It is assumed that the command has authentication information, added thereto, of the user operating the terminal 101. In a step S603, the MFP 103 having received this command sends a response "OK" to the terminal 101.

In a step S604, the terminal 101 sends a scan command instructing the MFP 103 to execute scanning, to the MFP 103. The MFP 103 having received this scan command determines in a step S605 whether or not the scan command can be accepted. This scan command acceptance determination process will be described hereinafter with reference to FIG. 11. The determination as to whether or not the scan command can be accepted means the same thing as the determination as to whether or not the first transmission process can be accepted. As described hereinafter, if the acceptance of the scan command is permitted as a result of the determination, the first transmission process is performed, whereas if not, the first transmission process is not performed. If the scan command can be accepted, the process proceeds to a step S606, whereas if not, the process proceeds to a step S615.

In the step S606, the MFP 103 sends a response "OK" to the terminal 101. Then, in a step S607, the terminal 101 sends a command for terminating the job, to the MFP 103. The MFP 103 having received this command sends a response "OK" to the terminal 101 in a step S608. When the reception of job transmission from the terminal 101 is thus completed, in a step S609, the MFP 103 displays on the console section 220 an original scan acceptance screen (see FIG. 7) indicating that the original scan has been accepted.

Figure 7:
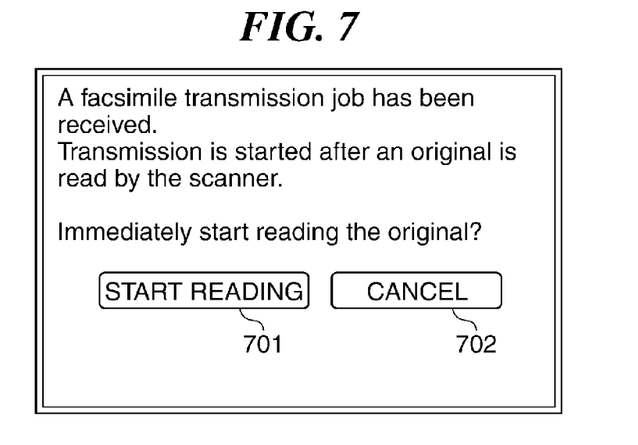
FIG. 7 is a view of an original scan acceptance screen.

As shown in FIG. 7, on the original scan acceptance screen, there are displayed a "Read" button 701 and a "Cancel" button 702. If the user selectively presses the "Read" button 701 in a step S610, the MFP 103 displays a scan setting screen on the console section 220 in a step S611. Therefore, the process proceeds to processing for making settings for starting scan in the first transmission process. On the other hand, if the "Cancel" button 702 is selectively pressed, the MFP 103 sends a response indicative of cancellation of the processing to the terminal 101.

Although the scan setting screen is not shown, the same contents as displayed when the setting field 503 is selected on the operation screen shown in FIG. 5 are displayed on the scan setting screen. When the user sets items on the scan setting screen and instructs execution of a scanning operation in a step S612, the MFP 103 performs the scanning operation according to the items set on the scan setting screen, in a step S613. Specifically, the CPU 211 controls the scanner 222 to read an original to thereby generate image data. The scanning process is executed according to the settings made in the setting field 503 in FIG. 5, but if any of the settings is changed on the scan setting screen displayed in the step S611, the scanning process is executed according to the changed settings. Then, in a step S614, the MFP 103 faxes the image data generated by scanning. Specifically, the CPU 211 controls the fax section 305 and the modem 223 to fax the image data. The destination of this facsimile transmission is the same as the telephone number set in the setting field 502 in FIG. 5.

On the other hand, if it is determined in the step S605 that the scan command cannot be accepted, the MFP 103 sends a response "Busy" indicating that the scan command cannot be accepted to the terminal 101. When receiving the response "Busy", the terminal 101 sends the scan command again in a step S616 after the lapse of a predetermined time period. The MFP 103 determines again in a step S617 whether or not the scan command can be accepted, and sends a result of the determination to the terminal 101 in the step S615 or a step S618. Note that, in FIG. 6, as to the result of this determination, only a case (step S618) is shown in a continuous manner where the scan command can be accepted and the MFP sends the response "OK" to the terminal 101.

The terminal 101 repeatedly performs the scan command transmission until the acceptance of the scan command is permitted. When the acceptance of the scan command is permitted, the process proceeds to the step S606 or S618 (it should be regarded that the step S618 is followed by the same processing steps as in the case of the step S606). However, when the number of times of the repeated transmission exceeds a predetermined value or when the total time period over which the repeated transmission is performed exceeds a predetermined time period, an error notification may be issued.

As described above, when receiving the instruction for the facsimile transmission job including the scan command from the terminal 101, the MFP 103 determines whether or not the scan command can be accepted. Then, if the scan command can be accepted, the MFP 103 causes the console section 220 to display the original scan acceptance screen (see FIG. 7), scans the original when a scan execution instruction is issued from the user, and then faxes the image data obtained by the scan. In the first transmission process, image data obtained by the scan performed by the MFP 103 is faxed, as described above. On the other hand, in the second transmission process, image data prepared by the terminal 101 is faxed from the MFP 103. In the following, the second transmission process will be described with reference to FIGS. 8 to 10.

Figure 8:
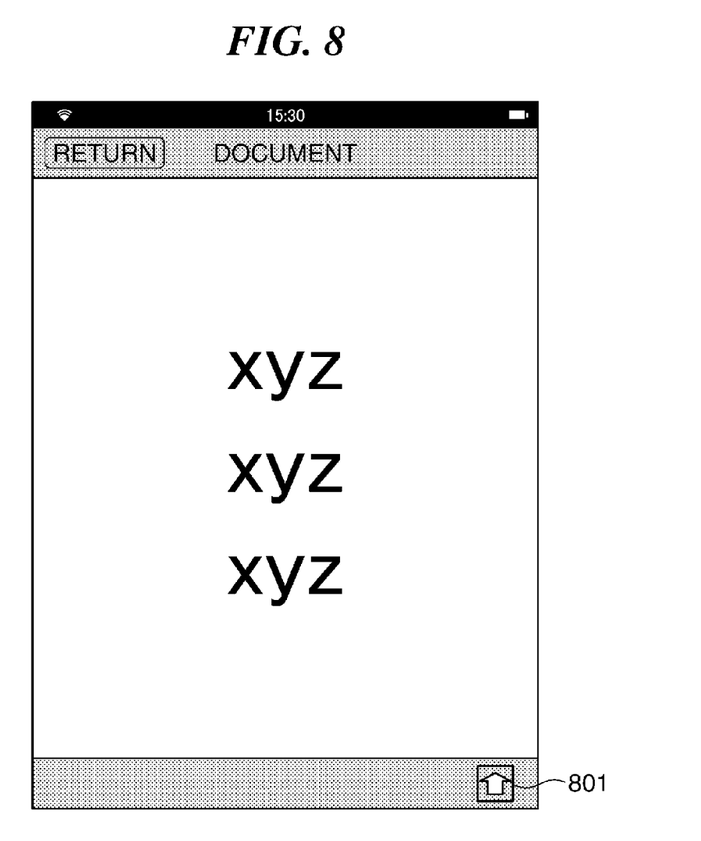
FIG. 8 is a view of an example of an operation screen of a data management application.

FIG. 8 is a view of an example of an operation screen of a data management application displayed on the terminal 101. The terminal 101 stores image data items downloaded from the network and image data items photographed using a camera function provided in the terminal 101. It is possible to display the image data items sequentially by switching therebetween using a data management application installed in the terminal 101. On the operation screen shown in FIG. 8, there is displayed one of the stored image data items.

When the user presses an operation key 801 on the FIG. 8 operation screen, a screen for selecting a function to be performed for the currently displayed image data is displayed. On this screen, not only a mail transmission application and a printing application, but also the above-described facsimile transmission application and the like are displayed as selection candidates. When the user selects the facsimile transmission application from the selection candidates, the screen is switched to an operation screen shown in FIG. 9. Note that each of the applications can be downloaded from a server on the Internet and be additionally installed in the terminal 101.

Figure 9:
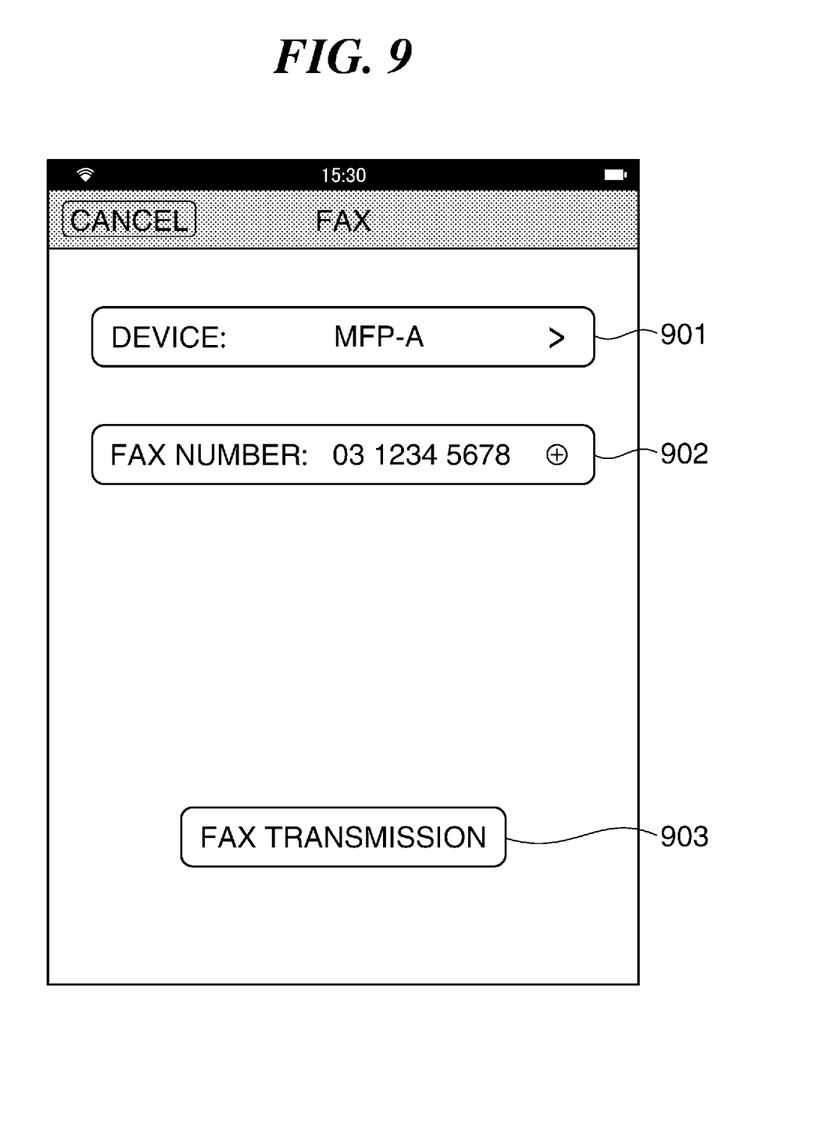
FIG. 9 is a view of an example of an operation screen of a facsimile transmission application, which is displayed when an instruction for a second transmission process is to be transmitted.

FIG. 9 is a view of an example of an operation screen of the facsimile transmission application, which is displayed on the console section 420 when an instruction for the second transmission process is to be transmitted. In this operation screen, setting fields 901, 902, and 903 are the same as the respective setting fields 501, 502, and 504 described with reference to FIG. 5.

Figure 10:
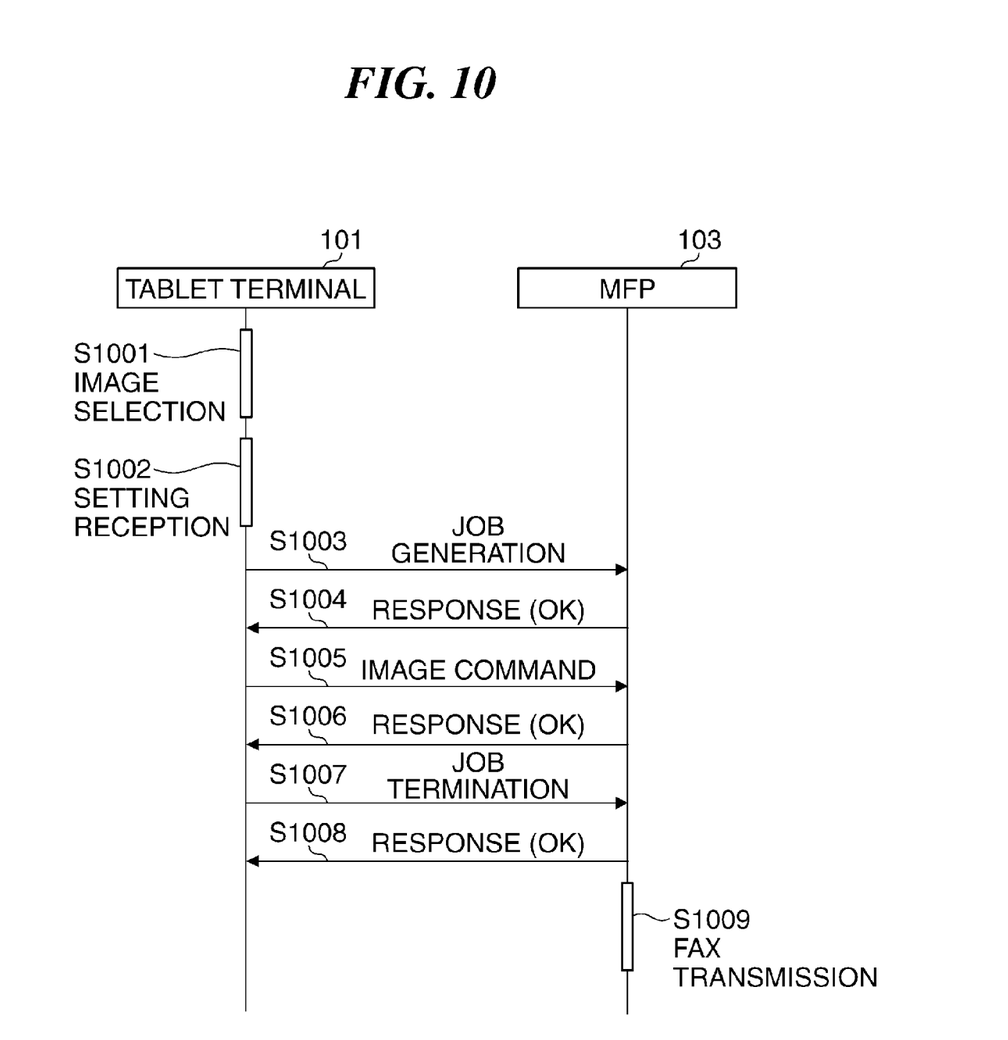
FIG. 10 is a diagram of a sequence of operations performed when the second transmission process is instructed.

FIG. 10 is a diagram of a sequence of operations performed between the terminal 101 and the MFP 103 when the terminal 101 designates the second transmission process.

The terminal 101 receives an image selection from the user via the FIG. 8 operation screen in a step S1001 and receives settings from the user via the FIG. 9 operation screen in a step S1002. In a step S1003, the terminal 101 sends a command for job generation to the MFP 103. The MFP 103 having received this command sends a response "OK" to the terminal 101 in a step S1004.

In a step S1005, the terminal 101 sends an image command to the MFP 103. This image command includes image data to be faxed from the MFP 103. This image data is the image data item acquired by the terminal 101 and displayed on the FIG. 8 operation screen. The MFP 103 having received the image command sends a response "OK" to the terminal 101 in a step S1006.

In a step S1007, the terminal 101 sends a command for terminating the job, to the MFP 103. The MFP 103 having received this command sends a response "OK" to the terminal 101 in a step S1008. In a step S1009, the MFP 103 faxes the image data received from the terminal 101. The destination of this facsimile transmission is the telephone number set in the setting field 902.

Thus, a process for causing the MFP 103 to fax the image data sent from the terminal 101 to the MFP 103 (i.e. the second transmission process) is performed according to the settings made on the terminal 101. In the second transmission process, the scanning process is not performed on the MFP 103, and hence, differently from the first transmission process, the facsimile transmission process is executed promptly without having to wait for an operation of the MFP 103 by the user.

Figure 11:
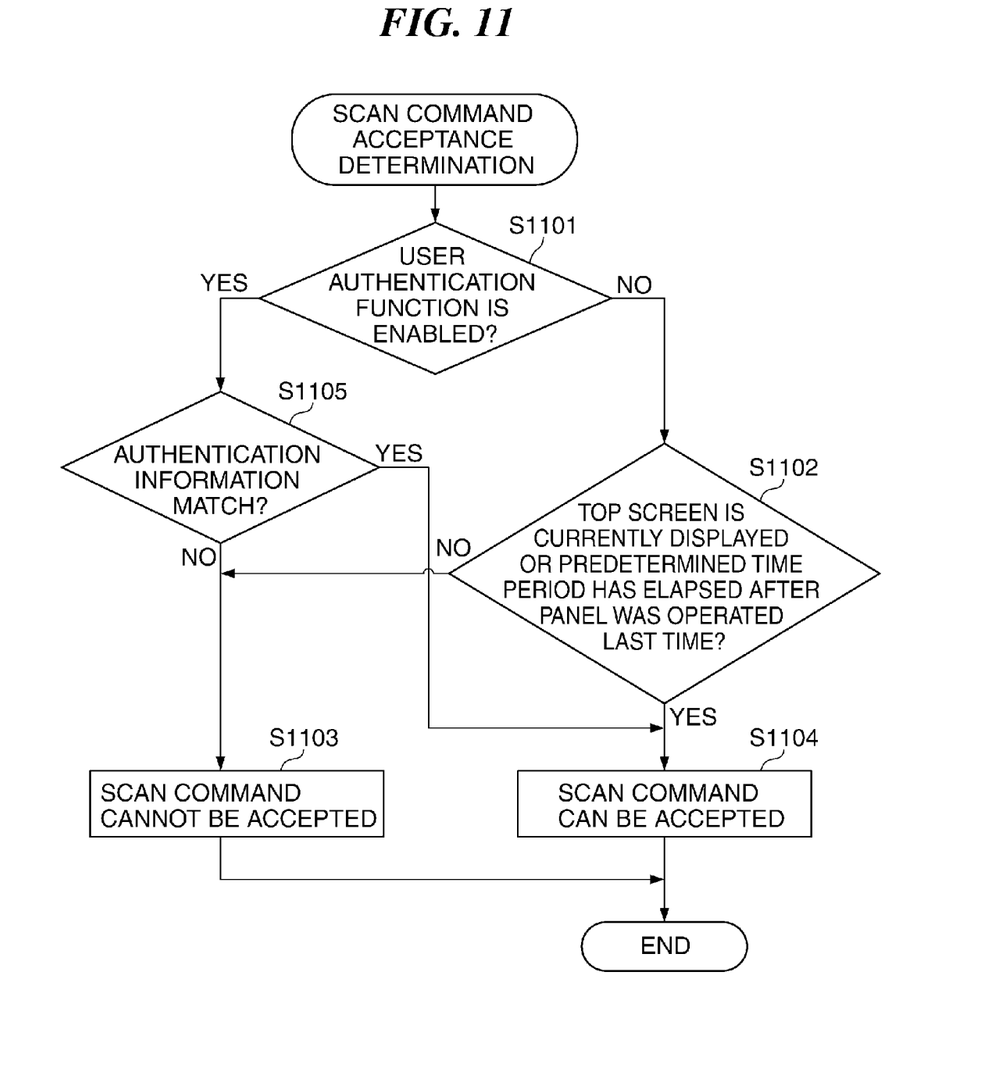
FIG. 11 is a flowchart of a scan command acceptance determination process.

FIG. 11 is a flowchart of the scan command acceptance determination process. Each operation (step) shown in the FIG. 11 flowchart is achieved by the CPU 211 of the controller 210 executing control programs stored in the ROM 212 in the MFP 103. The present process is executed in the step S605 in FIG. 6 when the MFP 103 receives the scan command from the terminal 101 according to an instruction for the first transmission process issued from the terminal 101.

First, the CPU 211 determines in a step S1101 whether or not the user authentication function of the MFP 103 is enabled. If it is determined that the user authentication function is enabled, the CPU 211 proceeds to a step S1105, whereas if the user authentication function is disabled, the CPU 211 proceeds to a step S1102.

In the step S1105, the CPU 211 determines whether or not authentication information added to the job generation command sent from the terminal 101 (in the step S602 in FIG. 6) matches authentication information of the currently logged-in user. If it is determined that the two pieces of authentication information match, which means that the authentication is successful, the CPU 211 proceeds to a step S1104 and determines that the scan command can be accepted. Accordingly, the acceptance of the first transmission process is permitted. On the other hand, if the two pieces of authentication information do not match, which means that the authentication is unsuccessful, the CPU 211 proceeds to a step S1103 and determines that the scan command cannot be accepted. Accordingly, the acceptance of the first transmission process is not permitted. After execution of the step S1103 or S1104, the FIG. 11 process is terminated.

In the step S1102, first, the CPU 211 determines a state of operation of the console section 220 when the scan command is received. Specifically, the CPU 211 determines whether or not at least one of a condition that a top screen has been displayed on the console section 220 of the MFP 103 and a condition that a predetermined time period has elapsed after the console section 220 was operated last time is satisfied. Note that the length of the predetermined time period is not limited. The top screen is displayed on the console section 220, as a screen for using a copy function, a scan function, or a fax function. This will be described with reference to FIG. 12.

Figure 12:
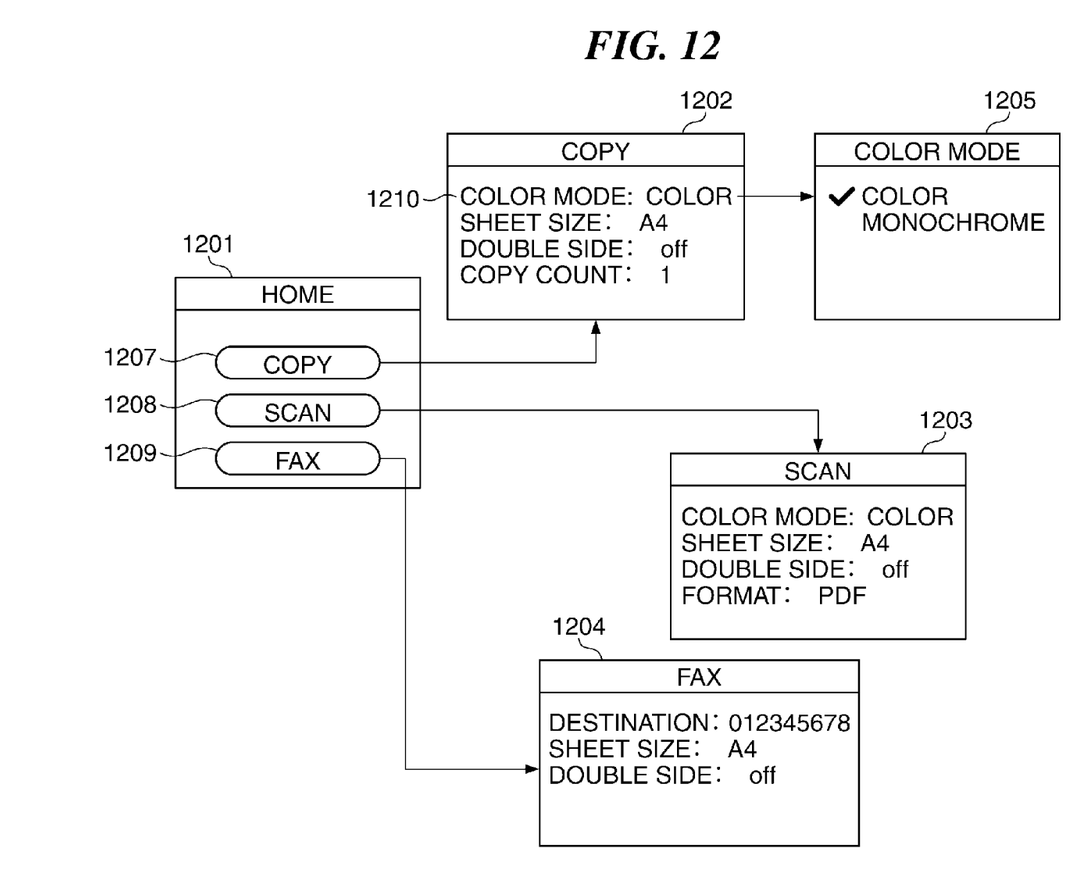
FIG. 12 is a diagram showing changes in a screen displayed on a console section.

FIG. 12 is a diagram showing changes in a screen displayed on the console section 220. A home screen 1201 is a function selection screen for selecting a function to be performed by the MFP 103. When a copy button 1207 is selected on the home screen 1201, the home screen 1201 is switched to a copy screen 1202. When a scan button 1208 is selected, the home screen 1201 is switched to a scan screen 1203. When a fax button 1209 is selected, the home screen 1201 is switched to a fax screen 1204. The top screen mentioned above corresponds to any of function selecting screens, such as the home screen 1201, and function screens, such as the screens 1202 to 1204.

Note that when a color mode display area 1210 is selected on the copy screen 1202, the copy screen 1202 is switched to a color mode selection screen 1205. The color mode selection screen 1205 and the like screen for setting a parameter concerning a selected function are not included in the top screens. Further, a popup screen displayed without screen switching when a function parameter is to be set is not included in the top screens, either.

If it is determined in the step S1102 that the condition is satisfied, it can be judged that the console section 220 is not being operated by a user different from the user having transmitted the job generation command. Therefore, the CPU 211 determines that the scan command can be accepted and the acceptance of the first transmission process is permitted (step S1104). On the other hand, when it is determined in the step S1102 that no top screen has been displayed and that the console section 220 has not been operated for the predetermined time period or longer, which means that the condition is not satisfied, it can be judged that the console section 220 may be being operated by a user different from the user having transmitted the job generation command. Therefore, the CPU 211 determines that the scan command cannot be accepted and the acceptance of the first transmission process is not permitted (step S1103).

As described above, even when the user authentication function is not enabled in the MFP 103, the CPU 211 determines whether or not the first transmission process can be accepted, according to a state of operation of the MFP 103 by a user different from the user having transmitted the job generation command. In this case, the first transmission process is not accepted during operation of the MFP 103 by the different user, and hence an erroneous operation by the user is prevented. Note that definition of the state of operation or the method of determining the state of operation is not limited to the above example.

According to the present embodiment, upon receipt of an instruction for the first transmission process from the tablet terminal 101, the MFP 103 determines, based on the state of operation of the console section 220, whether or not the first transmission process can be accepted. Then, if the acceptance of the first transmission process is permitted as a result of the determination, the CPU 211 controls the scanner 222 to read an original to thereby generate image data and then controls the fax section 305 and the modem 223 to fax the image data. However, if the acceptance of the first transmission process is not permitted, the CPU 211 does not execute the first transmission process.

Thus, irrespective of whether or not the user authentication function is used, it is possible to prevent an erroneous operation from being performed by a user different from the user having issued the instruction for the first transmission process (reading and transmitting process). In particular, even when the MFP 103 is not equipped with the authentication function for authenticating the user having issued the instruction for the first transmission process or when the authentication function is disabled though the MFP 103 is equipped therewith, the MFP 103 determines, based on the state of operation of the console section 220, whether or not the first transmission process can be accepted. Therefore, even when the authentication function cannot be used, it is possible to prevent an erroneous operation from being performed by a user different from the user having issued the instruction for the first transmission process. Thus, a mechanism is provided which makes it possible to prevent a different user from erroneously operating the MFP 103 when an original reading and transmission job is to be performed, without absolutely necessitating the user authentication function even in a case where a plurality of users share the use of the MFP 103.

On the other hand, in a case where the authentication function is enabled, whether or not the first transmission process can be accepted is determined based on a result of authentication by the authentication function, irrespective of the state of operation of the console section 220, so that if the authentication is successful, it is possible to promptly start the first transmission process.

Further, in a case where the acceptance of the first transmission process is not permitted, the CPU 211 sends the response "Busy", which indicates information to the effect, to the sender of the instruction for the first transmission process (step S615 in FIG. 6). This makes it possible to notify that the first transmission process is not executed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250821 filed Dec. 11, 2014 which is hereby incorporated by reference herein in its entirety.

What is claimed is:

1. An image processing apparatus having a plurality of functions, including at least a copy function and a transmission function, and communicable with a mobile terminal via a network, the image processing apparatus comprising:
   an operation device;
   a reading device that reads an original;
   a memory device that stores instructions; and
   at least one processor that implements the instructions stored in the memory to:
      control the operation device to display a selection screen where a desired function, among the plurality of functions, is selectable;
      receive a request regarding the transmission function from the mobile terminal via the network;
      control the operation device to change a screen to be displayed on the operation device:
         in accordance with the request regarding the transmission function received from the mobile terminal, from the selection screen to a predetermined screen, and then
         in accordance with a first user operation received from the operation device while the predetermined screen is displayed on the operation device, from the predetermined screen to a transmission setting screen on which a destination set by the mobile terminal as a transmission destination of the image data is set; and
      control, in accordance with a second user operation for executing a process regarding the transmission function received from the operation device while the transmission setting screen is displayed on the operation device, the reading device to read an original to obtain image data and to transmit data based on the obtained image data to the transmission destination.

2. The image processing apparatus according to claim 1, wherein in a case where the request regarding the transmission function is received from the mobile terminal while a screen other than the selection screen is displayed in the operation device, the at least one processor notifies the mobile terminal of an error via the network.

3. The image processing apparatus according to claim 1, wherein:
   the plurality of functions further include an authentication function for authenticating a user that sent the request regarding the transmission function,
   the at least one processor further determines, in a case where the authentication function is enabled, regardless of the screen currently displayed on the operation device, whether or not to change the screen displayed on the operation device to the predetermined screen in accordance with a result of authentication.

4. The image processing apparatus according to claim 3, wherein the at least one processor further determines, in a case where the request regarding the transmission function is received and the authentication function is disabled, whether or not to change the screen displayed on the operation device to the predetermined screen based on a type of screen being currently displayed on the operation device.

5. The image processing apparatus according to claim 1, wherein:
   the predetermined screen includes a displayed item for executing the transmission function, and
   the first user operation is for selecting the displayed item for executing the transmission function.

6. The image processing apparatus according to claim 5, wherein:
   the predetermined screen includes a displayed item for canceling the execution of the transmission function, and
   in a case where a third user operation for canceling the execution of the transmission function is received from the operation device while the predetermined screen is displayed on the operation device, the at least one processor notifies the mobile terminal that the execution of the transmission function is canceled.

7. The image processing apparatus according to claim 2, wherein:
   at least one processor further controls the operation device to change the screen to be displayed on the operation device:
      in a case where no operation request is made by the mobile terminal for a predetermined time period, from any screen other than the selection screen to the predetermined screen, even in a case where an operation request from the mobile terminal is received while the screen other than the selection screen is displayed on the operation device, and then in accordance with the request regarding the transmission function received from the mobile terminal while the predetermined screen is displayed on the operation device, from the predetermined screen to the transmission setting screen.

8. A method of controlling an image processing apparatus having a plurality of functions, including at least a copy function and a transmission function, and communicable with a mobile terminal via a network, and including an operation device, a reading device that reads an original, and at least one processor, the method being executable by the at least one processor and comprising the steps of:

displaying, on the operation device, a selection screen where a desired function, among the plurality of functions, is selectable;

receiving a request regarding the transmission function from the mobile terminal via the network;

controlling the operation device to change a screen to be displayed on the operation device:

in accordance with the request regarding the transmission function received from the mobile terminal, from the selection screen to a predetermined screen, and then in accordance with of a first user operation received from the operation device while the predetermined screen is displayed on the operation device, from the predetermined screen to a transmission setting screen on which a destination set by the mobile terminal as a transmission destination of the image data is set; and controlling, in accordance with a second user operation for executing a process regarding the transmission function received from the operation device while the transmission setting screen is displayed on the operation device, the reading device to read an original to obtain image data and to transmit data based on the obtained image data to the transmission destination.

9. A non-transitory computer-readable storage medium storing a computer-executable program executable by at least one processor of an image processing apparatus having a plurality of functions, including at least a copy function and a transmission function, and communicable with a mobile terminal via a network, and including an operation device and a reading device that reads an original, to execute a method of controlling the image processing apparatus, the method comprising the steps of:

displaying, on the operation device, a selection screen where a desired function, among the plurality of functions, is selectable;

receiving a request regarding the transmission function from the mobile terminal via the network;

controlling the operation device to change a screen to be displayed on the operation device:

in accordance with the request regarding the transmission function received from the mobile terminal, from the selection screen to a predetermined screen, and then in accordance with a first user operation received from the operation device while the predetermined screen is displayed on the operation device, from the predetermined screen to a transmission setting screen on which a destination set by the mobile terminal as a transmission destination of the image data is set; and controlling, in accordance with a second user operation for executing a process regarding the transmission function received from the operation device while the transmission setting screen is displayed on the operation device, the reading device to read an original to obtain image data and to transmit data based on the obtained image data to the transmission destination.

10. The image processing apparatus according to claim 1, further comprising:

a facsimile interface for the transmission function that transmits image data to a transmission destination, wherein the transmission destination is a fax number and the transmission function transmits facsimile data based on the obtained image data to the transmission destination using the facsimile interface.

* * * * *